Figure 1:
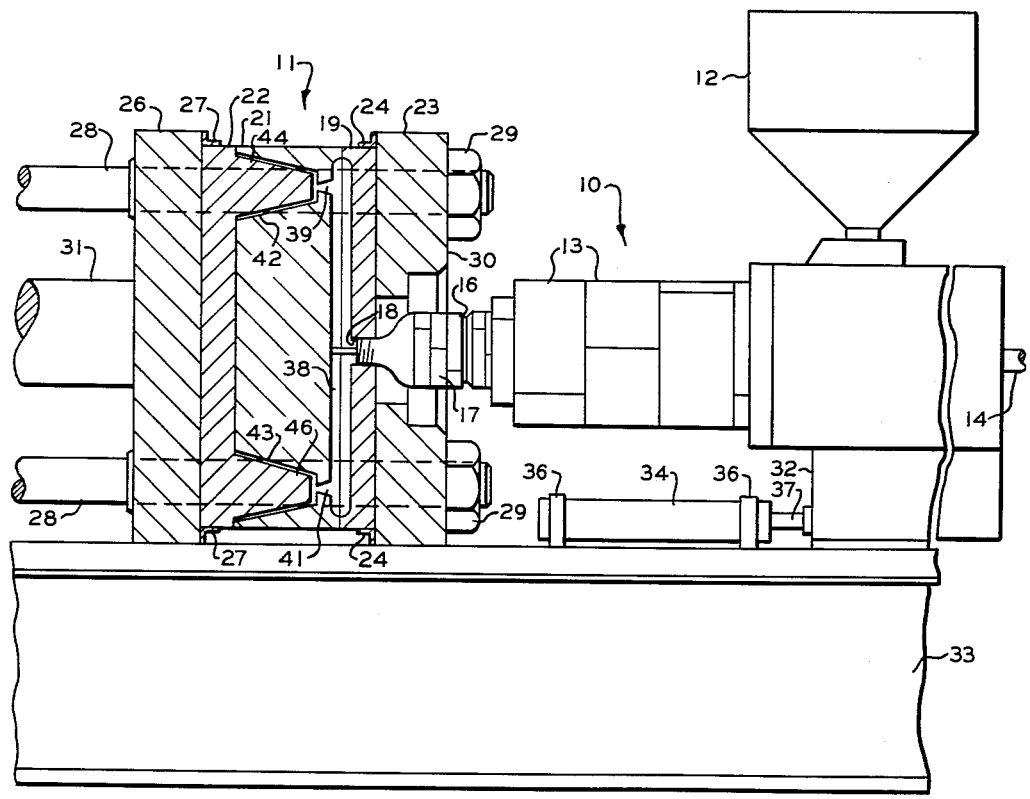

Dec. 12, 1961  J. N. SCOTT, JR., ET AL  3,012,280
INJECTION MOLDING OF PLASTIC MATERIALS
Filed July 16, 1959

INVENTORS
J. N. SCOTT, JR.
D. L. ALEXANDER
W. H. WHITTINGTON
BY
ATTORNEYS

United States Patent Office 3,012,280
Patented Dec. 12, 1961

3,012,280
INJECTION MOLDING OF PLASTIC MATERIALS
John N. Scott, Jr., Doyle L. Alexander, and William H. Whittington, Bartlesville, Okla., assignors to Phillips Petroleum Company, a corporation of Delaware
Filed July 16, 1959, Ser. No. 827,622
3 Claims. (Cl. 18—30)

This invention relates to the injection molding of thermoplastic materials. In one aspect, it relates to injection molding apparatus which is used in the manufacture of plastic articles. In another aspect, it relates to a method for the injection molding of thermoplastic materials.

Conventional molding apparatus of the injection type usually include an injection or heating cylinder having associated therewith an injection plunger or piston. The injection plunger reciprocates in the bore of the heating cylinder in such a manner as to allow the solid plastic material to be molded to enter the cylinder on the withdrawal stroke of the plunger. On the compression stroke of the plunger, the plastic material, now in a molten state, is forced from the injection cylinder through a nozzle and thence through runners or passages and sprues into cavities of the mold. It has been found to be desirable to provide for the precompression of the molten plastic material prior to its injection into the mold cavities in order to ensure that the plastic material completely fills the mold cavities in a minimum of time. In one arrangement of apparatus shown in the prior art, this precompression of the molten material is accomplished by the utilization of separate valves at each of the mold gates. This type of apparatus is quite complicated and is relatively expensive insofar as its original cost as well as its maintentance costs are concerned.

It is, therefore, an object of this invention to provide an improved injection molding apparatus.

Another object of the invention is to provide a novel nozzle having associated therewith a valve means for use in conjunction with injection molding apparatus whereby the molten plastic material is precompressed prior to its injection into mold cavities.

A further object of the invention is to provide an improved method for the injection molding of thermoplastic materials.

Other and further objects and advantages of the invention will become apparent to those skilled in the art upon consideration of the accompanying disclosure.

The present invention relates to an improved apparatus and method for the injection molding of plastic materials. In injection molding apparatus comprising a heating means, means for discharging molten plastic material under pressure from the heating means, a mold having formed therein a sprue which is in communication with the discharge means and means for moving the heating means and mold with relation to one another, the invention broadly resides in the improvement which comprises a valve means associated with the discharge means, the valve means being adapted to open and close upon movement of the heating means with relation to the mold so as to control the flow of molten plastic material through the discharge means. The apparatus of this invention makes it possible to obtain the desired precompression of the molten plastic material in the heating means while employing a single valve means associated with the discharge means or nozzle of the heating chamber of the injection molding apparatus. As compared to conventional apparatus employing separate valves at the mold gates, the apparatus of this invention makes possible a considerable saving in the cost of molds as well as a great reduction in maintenance cost. Furthermore, as the valve means is associated with the discharge means, the apparatus is much more versatile than conventional apparatus, the advantages of operation being obtainable with any type of standard mold.

In another embodiment of the invention, in a method in which plastic material is heated in a heating zone until it is in a molten condition and the molten material is thereafter forced under pressure through a discharge zone into a mold, the invention resides in the improvement of moving the heating zone with relation to the mold and thereby closing a valve in the discharge zone so as to interrupt the flow of molten material through the discharge zone, thereby causing the material within the heating zone to be subjected to a preselected pressure. By interrupting the flow of material through the discharge zone in this manner, it has been found that the material can be effectively precompressed in the heating zone. Now when the heating zone and the discharge zone are moved to their original positions with respect to one another, the molten material passes into the mold and completely fills the mold cavities in a minimum of time.

The materials which are molded in accordance with the present invention can be broadly defined as being thermoplastic synthetic resins. The invention is particularly applicable to materials which can be described as high density, highly crystalline solid polymers although low density, low crystallinity polymers can also be employed. The high density, highly crystalline solid polymers often have an inherent viscosity of at least 0.8, preferably an inherent viscosity between 1.2 and about 10, as determined from a solution of 0.1 gram of polymer in 500 cc. of tetralin at 150° C. The polymers also have a crystallinity of at least 70 percent, preferably at least 80 percent, and more desirably at least 90 percent, at 25° C. The crystallinity of the polymers can be determined by measurements of nuclear magnetic resonance (Wilson and Pake, Journal of Polymer Science, 10, 503 (1953)), using a sample of polymer which is in a state approaching equlibrium at 25° C. An approach to this equilibrium state can be achieved by heating the polymer sample to a temperature of about 50° C. above its crystalline melting point, maintaining the sample at this temperature for about one hour, and then cooling to 25° C. at a rate characterized by a fall of about 1.5° C. per minute at 145° C. The softening point of the polymer varies with the particular polymer used, increasing as the density and crystallinity of polymer increases. Generally, the softening point of the high density solid polymer is about 250° F., preferably in the approximate range of 250 to 300° F., and is several degrees higher, e.g., about 10° F. higher, than the melting point of the polymer.

Highly crystalline polymers having the above-described properties are preferably produced by the method described in U.S. Patent No. 2,825,721 of J. P. Hogan and R. L. Banks, issued on March 4, 1958. As described in detail in the Hogan and Banks patent, the polymers to be molded in accordance with the present invention can be produced by contacting an aliphatic 1-olefin with a catalyst comprising as its essential ingredient from 0.1 to 10 or more weight percent chromium in the form of chromium oxide, preferably including a substantial amount of hexavalent chromium. The chromium oxide is ordinarily associated with at least one other oxide, particularly at least one oxide selected from the group consisting of silica, alumina, zirconia and thoria. It is preferred that the plastic materials which are to be molded in accordance with this invention be polymers of ethylene or propylene or mixtures of ethylene and other unsaturated hydrocarbons, e.g., mixtures of ethylene with minor amounts of monoolefins containing up to and including six carbon atoms per molecule, such as propylene, 1-butene and 1-pentene.

While it is preferred to use in the practice of this invention polymers produced in accordance with the Hogan and Banks process, it is to be understood that polymers produced by other methods can also be utilized. For example, a polymer which can be advantageously used can be produced by contacting an olefin, such as ethylene or propylene, with a catalyst comprising a mixture of an organometallic compound, such as an aluminum trialkyl, and a halide of a group IV metal of the periodic table, such as titanium tetrachloride. In another method for producing a suitable polymer, an olefin, such as ethylene, is polymerized in the presence of a catalyst comprising an organometallic halide, such as ethylaluminum dichloride, and a halide of a group IV metal, such as titanium tetrachloride. Although it is usually preferred to utilize the above-mentioned polymers, it is to be understood that the invention is broadly applicable to the molding of thermoplastic materials and that polymers such as polystyrene, polyvinyl chloride, copolymers of vinyl chloride and vinylidene chloride, nylon, and the like, can be utilized in the practice of the invention.

Figure 2:
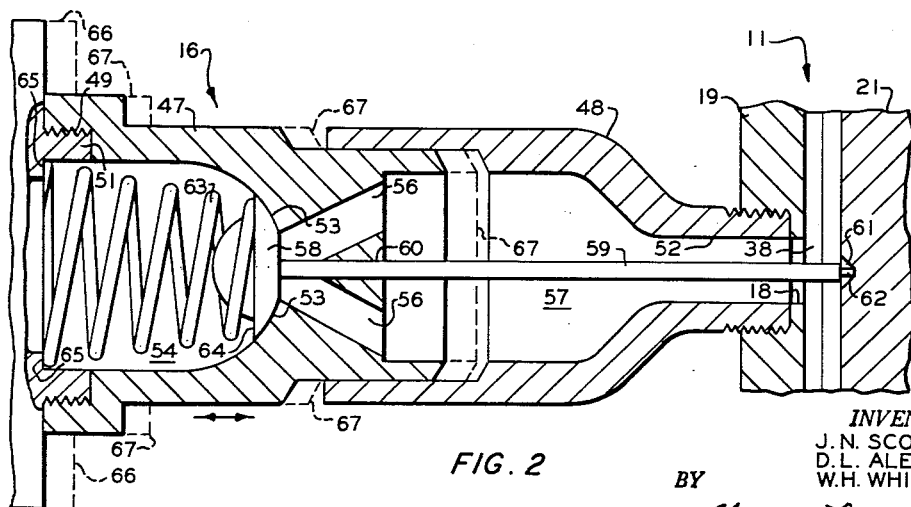

A more comprehensive understanding of the invention can be obtained by referring to the drawing, in which:

FIGURE 1 is an elevational view, partly in section, illustrating a preferred embodiment of the invention; and FIGURE 2 is an elevational view, partly in section, which illustrates the details of the discharge means or nozzle and its associated valve means of the injection molding apparatus of this invention.

Referring now to the drawing, and in particular to FIGURE 1, the injection molding apparatus includes two main components, namely, injection or heating cylinder 10 and mold 11. A solid plastic material, usually in granular form, is introduced into heating cylinder 10 through hopper 12. The heating cylinder is provided with suitable heating means 13 for converting the solid plastic material to a molten condition. As illustrated, the heating means includes a plurality of electrical heating elements which are wrapped around the heating cylinder. However, it is to be understood that any suitable means for heating the plastic material can be used in the practice of the invention. A plunger 14 reciprocates in the bore of the heating cylinder, thereby providing means for discharging the molten material through nozzle 16. Plunger 14 is generally connected to a hydraulic system comprising a hydraulic cylinder and piston (not shown), which operates so as to move the plunger in the bore of the heating cylinder. Nozzle 16 is preferably provided with heating means 17 which can also be in the form of electrical heating elements wrapped around the nozzle. One end of the nozzle is fixedly attached to heating cylinder 10 while the other end is threaded into sprue 18 of mold 11.

Mold 11 comprises three principal parts which are designated herein as runner plate 19, cavity plate 21 and core plate 22. The runner plate is rigidly attached to stationary platen 23 by any suitable means such as angle irons 24 which are affixed to the runner plate and the platen by welding or other suitable means. Core plate 22 is similarly attached to movable platen 26 by means of angle irons 27. A plurality of support rods 28 extends through platens 23 and 26, one end of each of the rods having nuts 29 threaded thereon adjacent the outer face 30 of platen 23. The other ends of the rods rest in a stationary platen (not shown) and have nuts threaded thereon adjacent the outer face of that platen. Connected to movable platen 26 is a connecting rod 31 having at its other end a hydraulic piston which rides in a hydraulic cylinder (not shown).

Heating cylinder 10 is supported on a pedestal or runners 32 which in turn are positioned on base member 33 of the injection molding apparatus. A hydraulic cylinder 34 is rigidly attached to base member 33 by means of holding straps 36. Connected to pedestal 32 is a connecting rod 37 having at its other end a hydraulic piston (not shown) which rides in hydraulic cylinder 34. Through the operation of hydraulic cylinder 34, pedestal 32 and the supported heating cylinder can be moved on base member 33. Platens 23 and 26 also rest on base member 33, platen 23 being rigidly attached thereto while member 33 and platen 26, guided by rods 28, can be moved by means of connecting rod 31 and its associated hydraulic system.

Reference is now made to mold 11 which, as previously discussed, comprises three principal components, namely, runner section 19, cavity section 21 and core section 22. Identical grooves or channels are formed in adjacent surfaces of the runner and cavity plates. When the runner and cavity plates are pressed together as shown in the drawing, these grooves coincide and form runner or passageway 38. The particular runner illustrated in FIGURE 1 is in the shape of a straight tube having hemispherical ends. However, it is not intended to so limit the invention since molds with runners having configurations other than a straight line come within the scope of this invention. For example, it is within the purview of the invention to employ a mold having a runner which is in the form of a circular tube. Sprues 39 and 41 formed in cavity plate 21 connected the runner with the space between the walls of cavities 42 and 43 and the surfaces of cores 44 and 46. The sprue openings into these spaces are usually termed the mold gates.

The present invention is particularly applicable to the injection molding apparatus disclosed in copending U.S. patent application Serial No. 767,309, filed on October 15, 1958 by J. N. Scott, Jr. As disclosed in detail in this application, an injection molding apparatus is provided which includes a mold having an enlarged runner system. Utilization of this runner system makes it possible to maintain the plastic material in a molten condition in the runner between cycles so that it is unnecessary to separate the cavity plate from the runner plate upon completion of each shot so as to remove solidified material from the runner. The runner and cavity plates as a result can be securely clamped together so that the mold is actually operated as a two-plate mold during the molding operation.

Referring now to FIGURE 2 of the drawing, there is illustrated in detail the nozzle or discharge means which is connected to the heating cylinder and the mold. Identical reference numerals have been used in FIGURE 2 in order to designate elements which have previously been described in conjunction with FIGURE 1. The nozzle comprises two body members which for convenience are designated as inner body member 47 and outer body member 48. The inner body member is attached at its inner end to heating cylinder 10 by means of internal threads 49 which cooperate with threads formed on projection 51 of the heating cylinder. The outer end of outer body member 48, which is in the form of an orifice 52, is threadedly attached to sprue 18 formed in runner plate 19 of mold 11. The inner end portion of outer body member 48 encompasses the outer end portion of inner body member 47. As a result of this arrangement, the inner body member and the outer body member can move with respect to one another. The inner and outer body members are in effect hollow so that molten plastic material can pass therethrough from the outlet of the heating chamber into runner 38 of the mold. A valve seat 53 is formed within passageway 54 of inner body member 47, and a plurality of passages 56, formed in inner body member 47, lead from passageway 54 to passageway 57 of outer body member 48. A valve plug 58, which is positioned within passageway 54 of the inner body member, is adapted to seat in valve seat 53. Attached to the face of valve plug 58 facing mold 11 is a valve stem 59. The valve stem is supported in opening 60 which is formed in an interior portion of the inner body member. The valve stem extends from the valve plug through opening 60 and thence through passageway 57 and orifice 52 of the outer body member. When the valve plug is seated in valve seat 53 as shown in FIGURE 2, the unattached end of valve stem 59 rides in a depression 61 cut or formed in cavity plate 21 of mold 11. The extreme outer end 62 of valve stem 59 is preferably of a smaller diameter than the valve stem proper and depression 61 has inwardly sloping sides, being substantially conical in shape. By utilizing this type of structure, it is assured that the end of the valve stem will remain properly positioned in depression 61. A resilient member, such as coil spring 63, which is disposed between face 64 of valve plug 58 and shoulder 65 formed adjacent the outlet of heating cylinder 10, tends to maintain valve plug 58 in position in its seat 53.

In the operation of the apparatus of this invention as illustrated in FIGURES 1 and 2, valve plug 58 is positioned in its valve seat 53 at the start of a cycle of operation. Platens 23 and 26 and the mold plates are disposed as illustrated in FIGURE 1 and the heating cylinder is in its withdrawn position as shown in FIGURE 2. When the heating cylinder is in this position, the molten material formed in the heating cylinder can not leave the nozzle through orifice 52, being confined to the heating cylinder and passageway 54 of inner body member 47 by the closed valve plug. As a result, through the operation of the plunger in heating cylinder 10, the molten material therein is subjected to a very high pressure, e.g., 20,000 p.s.i.g. and higher. When the pressure within the heating cylinder has reached a preselected value, the heating cylinder is moved a short distance, e.g., one to three inches, toward mold 19. This movement of the heating cylinder is accomplished through the operation of hydraulic cylinder 34 which is provided with a piston having a connecting rod 37 attached to pedestal 32 of the heating cylinder. The position of the heating cylinder after this movement from its initial withdrawn position is shown in FIGURE 2 by broken line 66. As a result of the movement of the heating cylinder, inner body member 47 also moves toward the mold, the position of this element after movement being shown by broken lines 67. When the inner body member is moved toward mold 11, valve plug 53 is unseated since its valve stem 59 is held in a stationary position by being in contact with stationary cavity plate 21. In other words, movement of the heating cylinder and attached inner body member 47 causes movement of valve seat 53 away from valve plug 58 to occur. The molten plastic material can now leave passageway 54 through passages 56 and thence flow through passageway 57 and orifice 52 of outer body member 48 into runner 38 of mold 11. Because of the very high pressure developed in the heating cylinder, the molten material rapidly fills the runner system and connecting sprues and thereafter enters the spaces between cavities 42 and 43 and the surfaces of cores 44 and 46. It is very desirable that the molten material fill these spaces as quickly as possible in order that a superior molded article can be produced. This is particularly the case where the molded articles have thin walls or relatively large surface areas. The molten material on entering a mold cavity immediately begins to solidify since the cavity and core plates are cold. If an extended period of time is required to fill the cavity, the articles obtained are often brittle or subject to warpage because of the uneven cooling operation. However, by compressing the molten material in the heating chamber, as provided for by the present invention, the material completely fills the mold cavities in a minimum of time so that the molded article is subjected to uniform cooling conditions. As a result, the finished article is not brittle, nor is it subject to warpage.

After sufficient of the molten material has passed into runner 38 through orifice 52 of nozzle 16 to completely fill the mold cavities, the heating cylinder is withdrawn to its initial position through the operation of the piston in hydraulic cylinder 34. Withdrawal of the heating cylinder and attached inner body member 47 causes valve plug 58 to be seated in valve seat 53. The molten plastic material is now compressed in the heating cylinder in the manner hereinbefore described in order to begin the next cycle of operation.

The molded article is removed from the mold after the core and cavity plates of the mold have been separated by withdrawal of the core plate. This withdrawal of core plate 22 is accomplished through the operation of the hydraulic system with which connecting rod 31 is associated. Thus, outward movement of connecting rod 31 causes platen 26 and attached core plate 22 to move on rods 28, thereby separating the core and cavity plates and making it possible to remove the finished molded articles from the mold. After the molded articles have been removed, platen 26 and attached core plate 22 are returned to the position shown in FIGURE 1 through the operation of the hydraulic system associated with connecting rod 31. When employing a hot runner system or a runner system such as is described in the above-mentioned copending application of J. N. Scott, Jr., the material in the runner system remains molten between each cycle of operation. However, when employing a cold runner system, the plastic material solidifies in the system and must be removed therefrom before proceeding with the next shot. When employing this latter type of mold, it is, therefore, necessary to separate the runner and cavity plates after each shot in order that the solidified plastic material can be removed from the mold. Although the present invention can be used in conjunction with molds employing cold runner systems, it is preferred to use molds in which the material in the runner system remains in a molten state between shots.

A more complete understanding of the invention can be obtained by referring to the following illustrative example which is not intended, however, to be unduly limitative of the invention.

Example

An injection molding apparatus which includes a nozzle similar to that illustrated in FIGURE 2 of the drawing is utilized to form containers having a comparatively thin wall. The mold which is used is one having an enlarged runner system such as is described in the above-mentioned copending application of J. N. Scott, Jr. When employing this mold, the plastic material remains in a molten state between cycles of operation, and it is unnecessary to remove solified material from the runner system after each shot.

A high density, highly crystalline polymer of ethylene is used in forming the molded containers. Initially, the valve plug is seated in its seat formed in the inner body member of the nozzle. The molten plastic material in the heating chamber is compressed to a pressure of about 20,000 p.s.i.g. at which time the heating cylinder and attached inner body member of the nozzle are moved toward the mold through the operation of a hydraulic system associated with the heating cylinder. Movement of the heating cylinder and the inner body member causes the valve plug to become unseated so that molten plastic material can now flow from the inner body member through the passageway and orifice of the outer body member and into the runner system of the mold. The molten material immediately and completely fills the space between the mold cavities and the core surfaces. The core plate is then withdrawn from the cavity plate, and the molded articles are removed from the cores. Each of the articles has a small sprue attached thereto which is readily removed in a cutting operation.

As soon as a shot of molten plastic material leaves the nozzle, the heating cylinder and its attached inner body member are returned to their original positions. As a result of this movement of the heating cylinder, the valve plug is now seated in its seat, thereby closing the passageway through the inner body member. The plunger of the heating cylinder now compresses the material in the cylinder to the preselected pressure prior to the commencement of the next cycle of operation. The time required for each cycle is about 20 seconds. The molded articles obtained are in all cases free from brittleness and show no signs of warpage.

From the foregoing, it is seen that the present invention provides a novel apparatus and method for the injection molding of thermoplastic materials. It will be apparent to those skilled in the art that many variations and modifications can be made in the present invention in view of the foregoing disclosure. Such modifications are believed to come within the spirit and scope of the invention.

We claim:

1. In injection molding apparatus comprising a heating cylinder having an inlet and outlet, means for forcing molten plastic material through said outlet of said heating cylinder, and a mold having a sprue formed therein, the improvement in a nozzle which comprises a first body member having a first passageway formed therein, one end of said member being attached to said outlet of said heating chamber and the other end being unattached; a second body member having a second passageway formed therein, one end of said member being attached to said sprue of said mold and the other end being unattached, the unattached end portion of said second member encompassing the unattached end portion of said first member so that said first and second passageways are substantially in alignment and said first and second members being adapted to move with relation to one another; a valve seat formed in said first passageway of said first member and facing said outlet of said heating cylinder; a valve plug adapted to seat in said valve seat and thereby close said first passageway; a valve stem positioned within said first and second passageways and having one of its ends attached to said valve plug, the other end being disposed within said sprue of said mold and in contact with said mold; a resilient member disposed between said heating cylinder and said valve plug; and means for moving said heating cylinder and said mold with relation to one another.

2. In injection molding apparatus comprising a heating cylinder having an inlet and outlet, means for forcing molten plastic material through said outlet of said heating cylinder, and a mold having a sprue formed therein, the improvement in a nozzle which comprises a first body having a first passageway formed therein, one end of said member being attached to said outlet of said heating chamber and the other end being unattached; a second body member having a second passageway formed therein and an orifice formed therein as an extension of said second passageway, the end portion of said body member in which said orifice is formed being attached to said sprue of said mold and the other end portion of said body member being unattached and encompassing the unattached end portion of said first body member so that said first and second passageways are substantially in alignment, and said first and second body members being adapted to move with relation to one another; a plurality of passages formed in said first body member and communicating said first passageway with said second passageway; a valve seat formed in said first body member adjacent said passages and facing said outlet of said heating cylinder; a valve plug adapted to seat in said valve seat and thereby close said passages; a valve stem having one of its ends attached to said valve plug with the other end being disposed within said sprue of said mold and in contact with said mold and an intermediate portion of said valve stem being disposed within an opening formed in said first body member between said plurality of passages; a coil spring disposed between said heating cylinder and said valve plug; and means for moving said heating cylinder and said mold with relation to one another.

3. The injection mold apparatus according to claim 2 which includes a pedestal member on which said heat cylinder is positioned; a base member to which said mold is attached and on which said pedestal member is movably mounted; a hydraulic cylinder attached to said base member; and a hydraulic piston positioned within said hydraulic cylinder and having a connecting rod attached thereto and to said pedestal member.

References Cited in the file of this patent

UNITED STATES PATENTS

| | | |
|---|---|---|
| 2,359,839 | Goessling | Oct. 10, 1944 |
| 2,461,282 | Jobst | Feb. 8, 1949 |